(12) United States Patent
Koyama et al.

(10) Patent No.: US 6,527,449 B1
(45) Date of Patent: Mar. 4, 2003

(54) PIVOT BEARING

(75) Inventors: Toshisada Koyama, Miyota-machi (JP); Yasuhiro Mouri, Miyota-machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/707,334

(22) Filed: Nov. 7, 2000

(30) Foreign Application Priority Data

Nov. 16, 1999 (JP) .......................................... 11-325082
Oct. 4, 2000 (JP) ...................................... 2000-304412

(51) Int. Cl.[7] ............................................. F16C 27/00
(52) U.S. Cl. ........................ 384/535; 384/513; 384/569
(58) Field of Search ................................ 384/535, 381, 384/513, 569, 903

(56) References Cited

U.S. PATENT DOCUMENTS

| | | | | |
|---|---|---|---|---|
| 3,372,962 A | * | 3/1968 | Linsley ........................ | 384/535 |
| 3,619,017 A | * | 11/1971 | Robinson et al. ........... | 384/513 |
| 3,897,987 A | * | 8/1975 | Colao ........................ | 384/535 |
| 4,523,864 A | * | 6/1985 | Walter et al. ............... | 384/513 |
| 5,785,433 A | * | 7/1998 | Takahashi et al. .......... | 384/255 |
| 5,801,902 A | * | 9/1998 | Koeppel et al. ........... | 310/67 R |
| 5,996,230 A | * | 12/1999 | Miyazaki et al. ....... | 29/898.062 |
| 6,053,638 A | * | 4/2000 | Muraki et al. .............. | 384/513 |
| 6,256,173 B1 | * | 7/2001 | Chee et al. .............. | 360/265.6 |

FOREIGN PATENT DOCUMENTS

GB 2102512 * 2/1983 ................. 384/535

* cited by examiner

Primary Examiner—Christopher P. Schwartz
Assistant Examiner—Devon Kramer
(74) Attorney, Agent, or Firm—Frishauf, Holtz, Goodman & Chick, P.C.

(57) ABSTRACT

A pivot bearing of the present invention comprises inner rings, outer rings surrounding the inner rings and rollable balls arranged between the inner and outer rings. This pivot bearing does not have a sleeve which is provided on the outer rings of a conventional pivot bearing. Each of the outer rings is made thicker substantially by the thickness of the sleeve of the conventional pivot bearing than the outer rings of the conventional pivot. The other components of the pivot bearing according to the present invention than the outer bearings use commercially available components or standardized components manufactured in the ordinary manufacturing line at ball bearing manufacturers' factories. Thus, a simple, inexpensive and precise pivot bearing can be manufactured.

15 Claims, 5 Drawing Sheets

PIVOT BEARING

BACKGROUND OF THE INVENTION

1. Field of the Invention

The present invention relates to a pivot bearing, particular to a pivot bearing used for a disc drive memory system.

2. Description of the Related Art

As shown in FIGS. 1 and 2, a conventional pivot bearing comprises a pair of cylindrical inner rings 102 fixedly mounted on a shaft 101, a pair of cylindrical outer rings 103 coaxially surrounding the corresponding inner rings 102, a plurality of rollable balls 104 arranged between the inner rings 102 and the outer rings 103 and rotatable in the circumferential directions of the inner and outer rings 102 and 103 so that a relative rotational movement is made between the inner rings 102 and the outer rings 103 through the balls 104. The pivot bearing further has a sleeve 105 into which the outer rings 103 are fixedly inserted. The sleeve 105 is tightly inserted into a fixing hole formed in an external member such as the actuator block of a memory device.

FIG. 1 shows a conventional standard dual row type pivot bearing which has an annular spacer 106 sandwiched between the two outer rings 103. FIG. 2 shows a conventional dual row type pivot bearing, that is, an abutment dual row type pivot bearing in which the opposed ends of the two outer rings 103 are abutted against each other.

When such a pivot bearing is used for a precision machine or a precision instrument such as the actuator block of a rotary type recording medium apparatus, the bearing must be operated at very little irregular rotation and very little run-out and must be miniaturized. In order to reduce the irregular rotation and run-out, the dimensional accuracy and the assembly accuracy must be improved and it is desired that generation of out-gas (gas discharged from adhesive applied to the portions between the components of the bearing which are bonded together) be suppressed to a minimum or prevented by reducing the areas of the bonded portions or without using the adhesive. Further, it is desired that the number of the components of the pivot bearing be reduced in order to lower the number of the assembly steps and the manufacturing cost of the bearing.

It might be possible to overcome the above-mentioned disadvantages from the conventional pivot bearing by removing a sleeve from the bearing and inserting the outer rings of the bearing into a fixing hole formed in a component of a precision machine or a precision instrument. However, since the thin outer rings without being enforced are applied with a load from the external component, such a modified pivot bearing has a disadvantage that it can be used only when a low load is applied.

SUMMARY OF THE INVENTION

An object of the present invention is to provide a sleeveless pivot bearing which has such thicker outer rings than the outer rings of the conventional pivot bearing as bear load from the external member of the outer rings of the sleeveless pivot bearing, irregular rotation and run-out of the pivot bearing are prevented from occurring, the number of the assembly steps and the manufacturing cost are reduced, and adhesive which bonds the outer rings to an outer-ring holding external member and from which out-gas will be produced is not used.

Another object of the present invention is to provide a pivot bearing wherein the other components of the pivot bearing than the outer rings use commercially available components or components manufactured in the ordinary manufacturing line at ball bearing manufacturers' factories, whereby the cost of the production facilities and the manufacturing cost are reduced.

A further object of the present invention is to provide a miniaturized pivot bearing.

In order to achieve the objects of the present invention, a pivot bearing according to the present invention comprises a shaft, at least two cylindrical inner rings arranged in tandem and fixedly mounted on the shaft, at least two cylindrical outer rings arranged in tandem and coaxially surrounding the inner rings, rolling elements disposed between the inner rings and the outer rings and arranged circumferentially of them, wherein the outer rings inserted into an external member and fixed thereto have such a thickness that the outer ring can bear load applied from the external member.

The thickness of each of the outer rings of the pivot bearing of the present invention can have substantially the same thickness as the sum of the thickness of the outer rings and the thickness of the sleeve of the conventional pivot bearing.

The outer rings can be abutted against each other at adjacent ends of adjacent ones of the outer rings. Alternatively, an annular spacer surrounding said shaft is provided between each of adjacent pairs of the outer rings.

The outer rings can be directly fixed to the external member. Alternatively, a tolerance ring can be provided so as to surround said outer rings, for fixing the outer rings to the external member at a fixing hole formed therein. The tolerance ring can be formed by winding a steel plate into a cylindrical shape.

A holding mechanism for holding the tolerance ring can be provided on or in the outer rings. The holding mechanism can comprise snap rings provided in the outside outer rings, for receiving the engaging portions of the tolerance ring formed on its both ends. Alternatively, the holding mechanism can comprise enlarged annular flange portions each provided on each of the outside outer rings.

The pivot bearing can be of a multiple outer ring type comprising more than two outer rings. Further, the pivot bearing is of a ball bearing type.

DETAILED DESCRIPTION OF THE PREFERRED EMBODIMENT

The present invention will be described in detail by way of the preferred embodiments with reference to the accompanying drawings.

Figure 1:
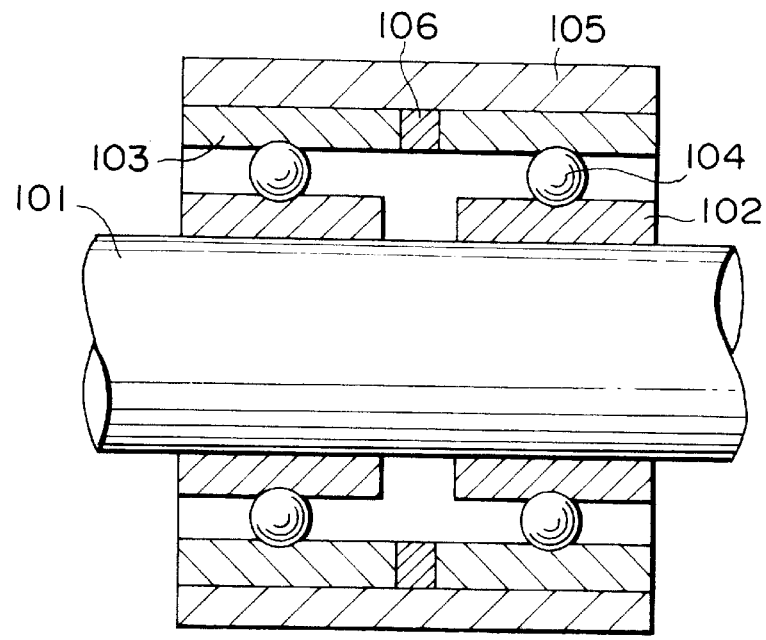
FIG. 1 is an axial cross sectional view of a conventional pivot bearing.
Figure 2:
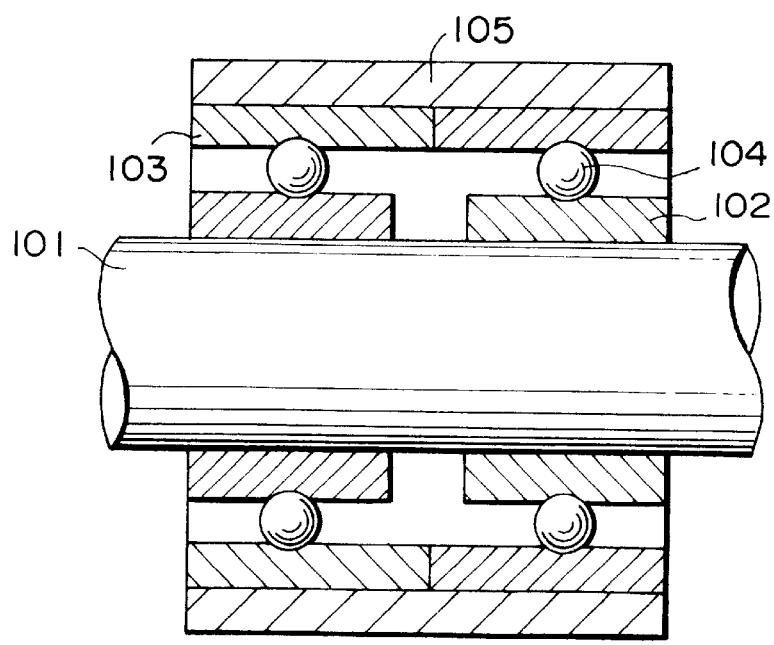
FIG. 2 is an axial cross sectional view of another conventional pivot bearing.
Figure 3:
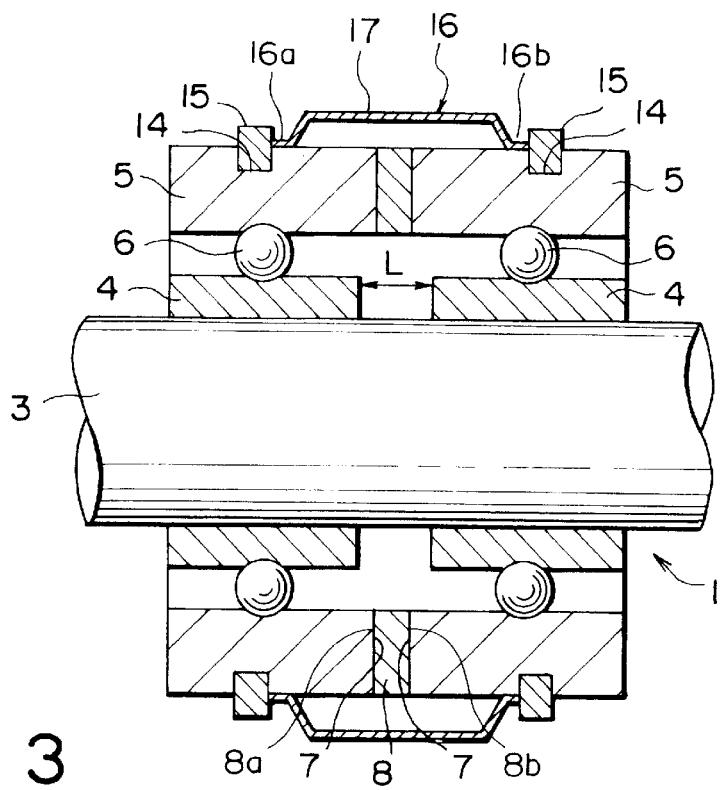
FIG. 3 is an axial cross sectional view of a first embodiment of a pivot bearing according to the present invention.
Figure 4:
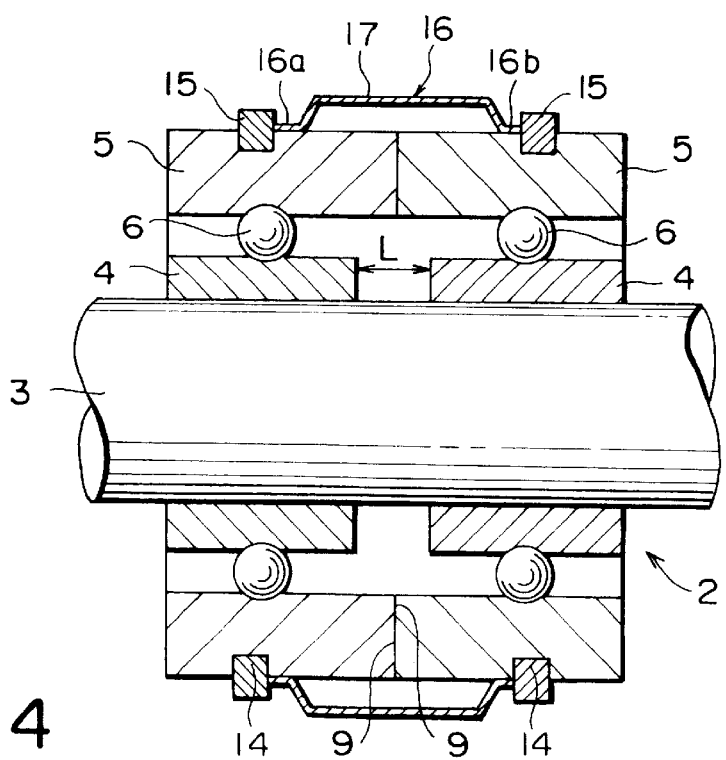
FIG. 4 is an axial cross sectional view of a second embodiment of a pivot bearing according to the present invention.

FIG. 3 shows a general axial cross sectional view of a pivot bearing of a dual row type pivot bearing type with a spacer (a first embodiment), and FIG. 4 illustrates a general axial cross sectional view of a dual row type pivot bearing with the opposed ends of the outer rings abutted against each other (a second embodiment).

As shown in FIGS. 3 and 4, each of pivot bearings 1 and 2 has two cylindrical inner rings 4 fixedly mounted on a shaft 3 in a tandem manner at a predetermined space L. Two cylindrical outer rings 5 coaxially surround the respective inner rings 4 with a predetermined space from the respective inner rings 4. A plurality of steel balls 6 are disposed between the inner rings 4 and the corresponding outer rings 5 so as to roll in the circumferential directions of the inner rings 4 and the outer rings 5. A relative rotational movement can be made between the inner rings 4 and the outer rings 5 through the balls 6.

In the pivot bearing 1 as shown in FIG. 3, an annular spacer 8 is provided between the two outer rings 5. The opposed ends 7 of the outer rings 5 are abutted against the respective ends 8a of the spacer 8. In the pivot bearing 2 as shown in FIG. 4, however, the two outer rings 5 are directly abutted against each other at their opposed ends 9. The opposed ends of the inner rings 4 are spaced from each other as shown by L. In the pivot bearings 1 and 2, the space L is selected to be a length more than the sum of the axial play between the inner rings 4 and the length of movement due to elastic deformation of the inner rings 4 after the inner rings 4 have been preloaded.

The thickness of each of the outer rings 5 of the pivot bearings 1 and 2 is larger than the thickness of the inner rings 4 and is set to a value so that the outer rings 5 can bear the load exerted by an external member into which the pivot bearings 1 and 2 are fixedly inserted. It means that the mechanical strength of the outer rings 5 is extremely increased as compared with the outer rings of the conventional pivot bearing. Thus, a pivot bearing which overcomes the disadvantage of the conventional pivot bearing is obtained.

The pivot bearings 1 and 2 according to the present invention do not use sleeves. Thus, an assembly error which exists between the outer rings and the sleeve of the conventional pivot bearing does not occur in the pivot bearings 1 and 2 according to the present invention. Irregular rotation and run-out of the pivot bearings 1 and 2 are reduced, resulting in improvement of bearing mechanical accuracies. In consequence, the pivot bearings 1 and 2 are suited for components of precision machines or instruments such as the actuator blocks of a disc drive memory system.

The sleeveless structure provides further advantages. Since no sleeve is used, adhesive for bonding the bearings to the sleeve as used in the conventional pivot bearing is not employed. Thus, such out-gas as will be discharged from the adhesive used in the conventional pivot bearing is not generated and no damage is given to the pivot bearings 1 and 2 due to the out-gas. The sleeveless structure reduces the number of the components of the bearings 1 and 2 thereby reducing the number of the assembly steps and the manufacturing cost. Further, the sleeveless structure provides a small-sized pivot bearing, that is, a miniaturized pivot motor. Still further, when the miniaturization is not questioned, the outer ring 5 is made much thicker than the outer ring of the conventional pivot motor.

When the miniaturization is not considered, the great advantage of the pivot bearing according to the present invention is that the other components than the outer rings 5 can use the components manufactured under the international industrial standard such as DIN, the Japanese Industrial Standard (JIS) or the manufacturers' industrial standards can be used as the other components of the pivot bearings 1 and 2 than the outer rings 5. Said other components are commercially available or manufactured in the ordinary production line at ball bearing makers' factories without using any special facilities. This remarkably reduces the manufacturing cost. In this case, each of the outer rings 5 can be made to have a thickness of the sum of the thickness of each of the outer rings and the thickness of the sleeve of the conventional pivot bearing to increase the mechanical strength of the outer rings 5.

Figure 5:
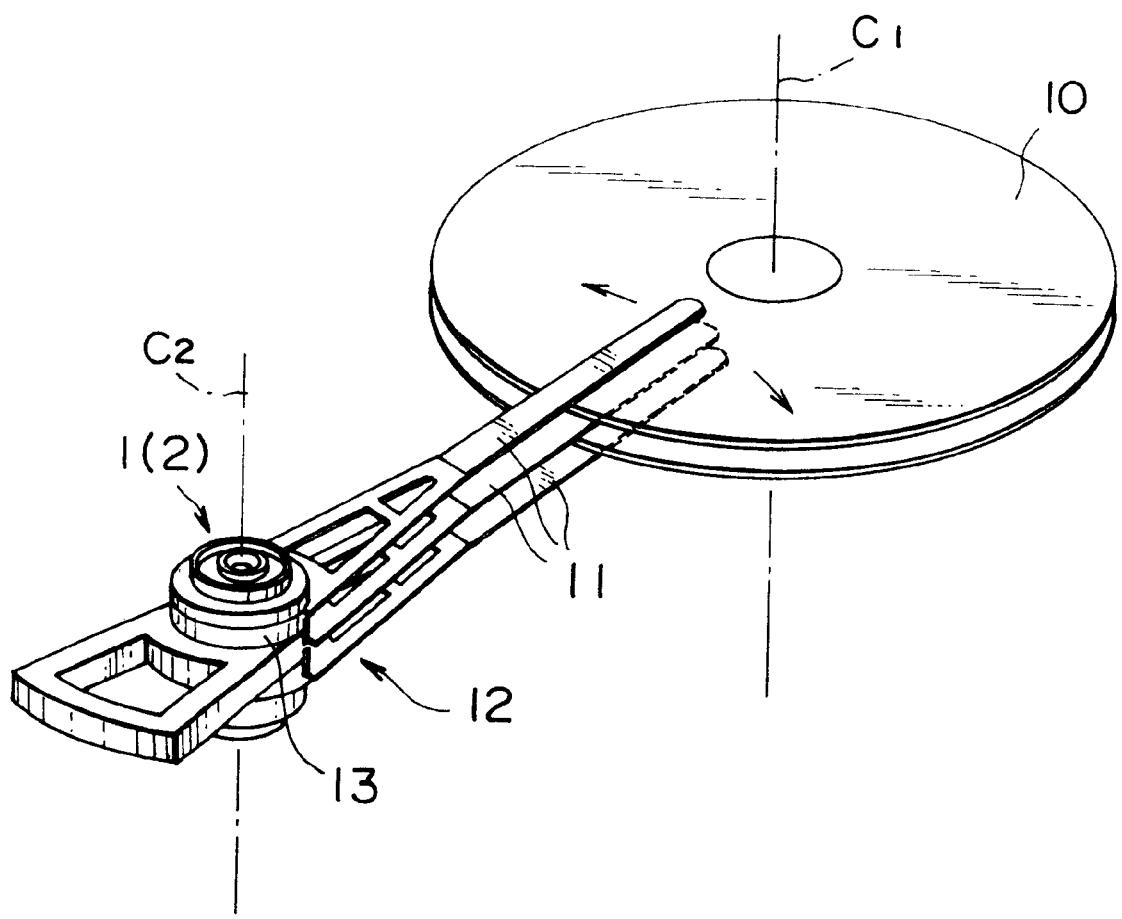
FIG. 5 is a perspective view of the actuator block of a hard disc apparatus in which the pivot bearing according to the present invention is mounted.

FIG. 5 shows an actuator block 12 having a rotary shaft 13 and suspensions 11 extending radially outward from the rotary shaft 13. The rotary shaft 13 is fixedly mounted on the outer rings 5 (FIGS. 3 and 4) so that the suspensions 11 accurately swing around the central axis $C_2$ of the rotary shaft 13. By the swing of the suspensions 11, recording and reading magnet heads formed on the forward ends of the suspensions 11 are accurately located on the predetermined recording or reading-out areas of rotary type recording media 10 such as hard discs which are rotated around their central axis $C_1$.

The pivot bearings 1 and 2 are described as ball bearing type pivot bearings. But they may be roller type pivot bearings. Here, the balls and rollers are called "rolling elements". The number of the inner rings and the outer rings which are arranged in tandem is not limited to two but is more than two.

Referring to FIGS. 3 and 4 again, annular grooves 14 are formed in the outer peripheral surface of each of the outer rings 5. Snap rings 15 are fitted in the annular grooves 14. A tolerance ring 16 is wound around the portion of the outer peripheral surfaces of the outer rings 5 between the snap rings 15. Both side end portions of the tolerance ring 16 are reduced in diameter to form annular engaging portions 16a and 16b. The engagement portions 16a and 16b elastically abut against the corresponding inner end faces of the snap ring 15.

Figure 6:
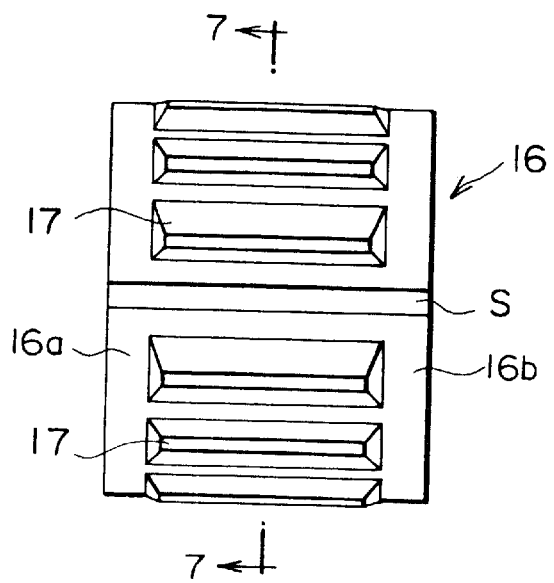
FIG. 6 is a side view of an embodiment of a tolerance ring for fixing a pivot bearing according to the present invention to an external member at its hole formed therein.
Figure 7:
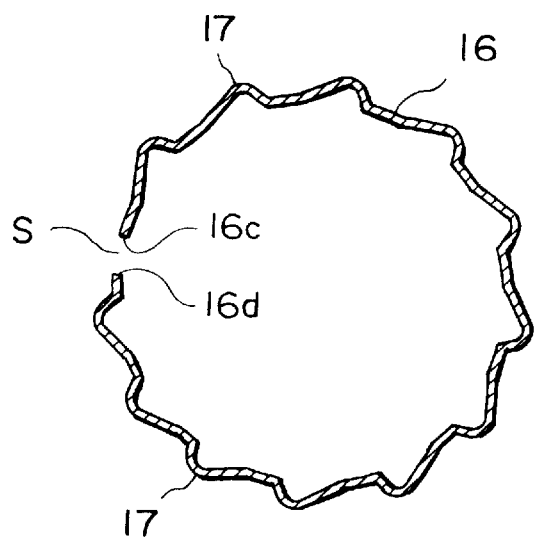
FIG. 7 is a cross sectional view of the tolerance ring taken along line 7—7 of FIG. 6.

As shown in FIGS. 6 and 7, the tolerance ring 16 is formed by winding a steel plate in a cylindrical shape in such a way that its diameter is larger than the outer diameter of the outer rings 5 in a free state but the inner diameter of each of the annular engaging portions 16a and 16b does not exceed the outer diameter of the snap rings 15. In the free state, opposed axially extending ends 16c and 16d of the tolerance ring 16 are circumferentially separated by a space S.

On the portion of the tolerance ring 16 other than its both the annular engaging portions 16a and 16b are formed a plurality of projecting portions 17 extending axially of the tolerance ring 16 and arranged equidistantly circumferentially of the tolerance ring 16. Each projecting portion 17 can have a shallow V-shape, a semicircular shape or any other suitable projecting shape. When the tolerance ring 16 is mounted on the outer rings 5, the diameter of an imaginary circle formed by the rounded apex of the projecting portion 17 is made larger than the outer diameter of the snap ring 15 and also larger than the inner diameter of the fixing hole of an external member (such as the actuator block 12 as described above) into which the pivot bearing 1 or 2 is inserted, as will be described later.

The tolerance ring 16 is wound around the two outer rings 5 and mounted between the snaps 15. Then, the tolerance ring 16 is pushed together with the pivot bearing 1 or 2 into the fixing hole formed in the external member. The tolerance ring 16 is pressed inwardly by the inner surface of the fixing hole of the external member so that the load applied by the external member is evenly distributed over the whole length of the outer rings 5. Thus, the external member is rotated smoothly and accurately.

Figure 8:
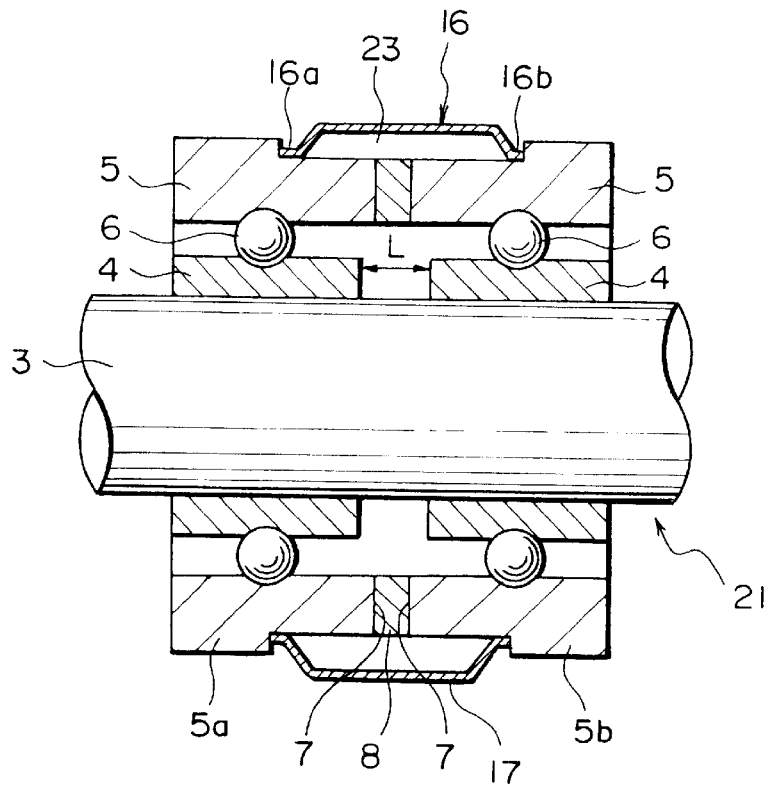
FIG. 8 is an axial cross sectional view of a third embodiment of a pivot bearing according to the present invention.
Figure 9:
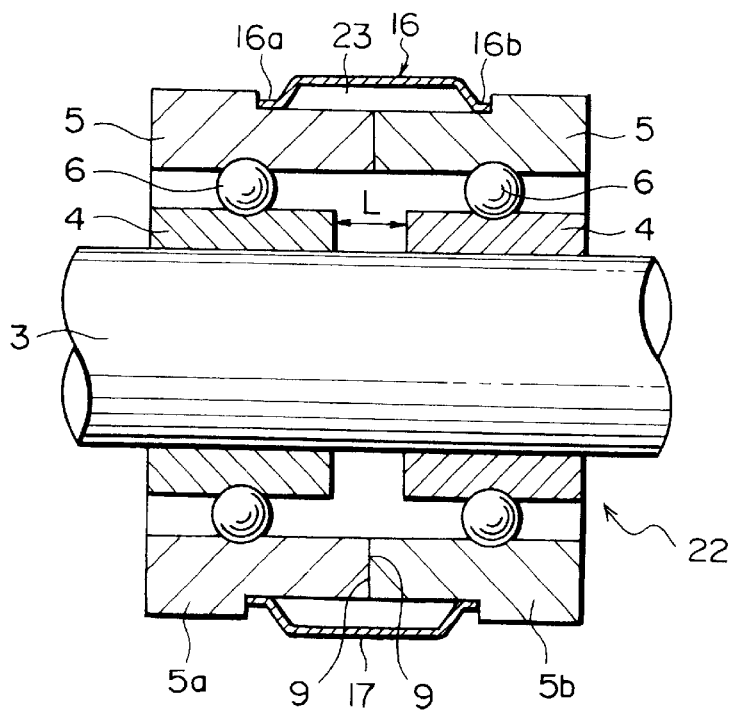
FIG. 9 is an axial cross sectional view of a fourth embodiment of a pivot bearing according to the present invention.

FIG. 8 shows a third embodiment of a pivot bearing 21 and FIG. 9 illustrates a fourth embodiment of a pivot bearing 22 of the present invention. They are modified from the spacer type pivot bearing 1 of FIG. 3 and the outer ring abutting type pivot bearing 2 of FIG. 4, respectively. On the outside end portions of the outer rings 5 of the pivot bearings 21 and 22 are formed flange portions 5a and 5b. A tolerance ring 16 is received in an annular groove 23 formed in the portions of the outer rings 5 between the flange portions 5a and 5b so that the inner peripheral edges of the annular engaging portions 16a and 16b of the tolerance ring 16 are elastically pressed against the bottom of the annular groove 23 and the inner side faces of the flanged portions 5a and 5b. Since the annular groove 23 is formed in the outer rings 5, snap rings 15 provided in the outer rings 5 of FIGS. 3 and 4 are not required. Thus, the number of the components of the pivot bearings 21 and 22 is reduced as compared with the pivot bearings 1 and 2 described as the first and second embodiments. The other components are the same as those of the first and second embodiments. In consequence, the description thereof is omitted.

What is claimed is:

1. A pivot bearing comprising:
   a shaft;
   at least two cylindrical inner rings arranged in tandem and fixedly mounted on said shaft;
   at least two cylindrical outer rings arranged in tandem and coaxially surrounding said inner rings; and
   rolling elements disposed between said inner rings and said outer rings and arranged circumferentially of said inner rings and said outer rings,
   wherein said outer rings are inserted into a rotary shaft of an actuator block and fixed thereto and have a thickness such that said outer rings can bear load applied from said rotary shaft of said actuator block.

2. The pivot bearing according to claim 1, wherein a thickness of said outer rings is larger than a thickness of said inner rings.

3. The pivot bearing according to claim 1, wherein said outer rings are abutted against each other at adjacent ends of adjacent ones of said outer rings.

4. The pivot bearing according to claim 1, wherein an annular spacer surrounding said shaft is provided between each of adjacent pairs of said outer rings.

5. The pivot bearing according to claim 1, wherein said outer rings are directly fixed to said rotary shaft of said actuator block.

6. The pivot bearing according to claim 1, wherein a tolerance ring surrounds said outer rings, for fixing said outer rings to said rotary shaft of said actuator block at a fixing hole formed therein.

7. The pivot bearing according to claim 6, wherein holding means for holding said tolerance ring is provided on or in said outer rings.

8. The pivot bearing according to claim 7, wherein each of said outer rings has an outer peripheral surface, said tolerance ring has engaging portions on both ends thereof, and said holding means comprises snap rings provided in the outside outer rings, for receiving the corresponding side ends of said tolerance ring.

9. The pivot bearing according to claim 7, wherein said holding means comprises enlarged annular flange portions provided on an outer surface of each of the outer rings.

10. The pivot bearing according to claim 7, wherein said tolerance ring comprises a steel plate wound into a cylindrical shape.

11. The pivot bearing according to claim 8, wherein said tolerance ring comprises a steel plate wound into a cylindrical shape.

12. The pivot bearing according to claim 6, wherein said tolerance ring comprises a steel plate wound into a cylindrical shape.

13. The pivot bearing according to claim 1, wherein said pivot bearing is of a dual row type.

14. The pivot bearing according to claim 1, wherein said pivot bearing is of a ball bearing type.

15. The pivot bearing according to claim 1, wherein said pivot bearing is sleeveless.

* * * * *